(12) United States Patent
Coric et al.

(10) Patent No.: US 11,345,796 B2
(45) Date of Patent: May 31, 2022

(54) INFLATABLE STOPPER

(71) Applicant: J. van Beugen Beheer B.V., Hellevoetsluis (NL)

(72) Inventors: Enver Coric, Schiedam (NL); Leonard Van Beugen, Goudswaard (NL)

(73) Assignee: J. VAN BEUGEN BEHEER B.V., Hellevoetsluis (NL)

( * ) Notice: Subject to any disclaimer, the term of this patent is extended or adjusted under 35 U.S.C. 154(b) by 84 days.

(21) Appl. No.: 16/862,607

(22) Filed: Apr. 30, 2020

(65) Prior Publication Data
US 2020/0255633 A1 Aug. 13, 2020

Related U.S. Application Data

(62) Division of application No. 15/792,810, filed on Oct. 25, 2017, now Pat. No. 10,676,597.

(30) Foreign Application Priority Data

Oct. 26, 2016 (NL) ...................................... 2017677

(51) Int. Cl.
| | | |
|---|---|---|
| *C08L 7/02* | (2006.01) | |
| *C08K 5/18* | (2006.01) | |
| *C08K 7/06* | (2006.01) | |
| *C08K 3/28* | (2006.01) | |
| *B32B 27/00* | (2006.01) | |
| *C08K 3/04* | (2006.01) | |
| *B29D 22/02* | (2006.01) | |
| *F16L 55/134* | (2006.01) | |
| *F16L 55/124* | (2006.01) | |

(52) U.S. Cl.
CPC .............. *C08L 7/02* (2013.01); *B29D 22/02* (2013.01); *B32B 27/00* (2013.01); *C08K 3/041* (2017.05); *C08K 3/28* (2013.01); *C08K 5/18* (2013.01); *C08K 7/06* (2013.01); *B32B 2274/00* (2013.01); *C08K 2201/003* (2013.01); *C08K 2201/004* (2013.01); *C08K 2201/016* (2013.01); *C08L 2205/06* (2013.01); *F16L 55/124* (2013.01); *F16L 55/134* (2013.01)

(58) Field of Classification Search
CPC .... C08L 7/02; C08K 5/18; C08K 7/06; C08K 3/041; C08K 3/28; F16L 55/134; B32B 27/00; B29D 22/02
USPC ......................................................... 524/254
See application file for complete search history.

(56) References Cited

U.S. PATENT DOCUMENTS

| | | | |
|---|---|---|---|
| 3,427,281 A | 2/1969 | Young et al. | |
| 5,439,032 A | 8/1995 | Petrone | |
| 5,477,886 A | 12/1995 | Van Beugen et al. | |
| 6,296,006 B1 | 10/2001 | Wegner | |
| 6,462,159 B1 | 10/2002 | Hamada et al. | |
| 2005/0229985 A1* | 10/2005 | Saxenfelt | A63B 41/02 138/93 |
| 2009/0192244 A1 | 7/2009 | Doyle et al. | |
| 2012/0192983 A1* | 8/2012 | Govaert | B29C 63/24 138/93 |
| 2012/0270996 A1 | 10/2012 | Pan et al. | |
| 2013/0186477 A1 | 7/2013 | Mainzer | |
| 2016/0108202 A1* | 4/2016 | Bosnyak | C08K 7/06 524/241 |

FOREIGN PATENT DOCUMENTS

| | | |
|---|---|---|
| CN | 105399997 A | 3/2016 |
| DE | 102011015476 B4 | 1/2013 |
| EP | 0543458 B1 | 6/1996 |
| EP | 0846140 B1 | 5/2003 |
| GB | 771628 A | 4/1957 |
| GB | 1192407 A | 5/1970 |
| GB | 1312636 A | 4/1973 |
| GB | 2011933 A | 7/1979 |
| WO | 2009021229 A1 | 2/2009 |
| WO | 2011009630 A1 | 1/2011 |
| WO | 2016130880 A1 | 8/2016 |

OTHER PUBLICATIONS

Carbon Nanotube, Wikipedia, last edited on Aug. 23, 2021. (Year: 2021).*
Search report for priority application NL2017677 dated May 12, 2017.

* cited by examiner

*Primary Examiner* — Hui H Chin
(74) *Attorney, Agent, or Firm* — Hoyng Rokh Monegier B.V.; David P. Owen

(57) ABSTRACT

The invention relates to a non-crosslinked natural rubber latex composition for an inflatable stopper comprising a homogeneous mixture of: a) natural rubber latex; b) a surfactant; c) an amine based chemical antiozonant; d) possibly ammonia and preferably e) single or double wall electrically conductive nanotubes. The invention furthermore relates to an ozone resistant inflatable stopper comprising non-crosslinked natural rubber latex and fiber reinforcement, the rubber having an ozone resistance according to ISO 1431/1 at 50 pphm concentration ozone at 23±2° C., for the time frame of 48 hours, atmospheric humidity of 55% and strain static exposure of 20% and preferably a surface resistivity lower than 100 GΩ according to DIN EN 60079-32-2 and DVGW G 5621-3 (VP) measured at 1000 V and a maximum relative humidity of 30%.

10 Claims, No Drawings

INFLATABLE STOPPER

CROSS REFERENCE TO RELATED APPLICATIONS

This application is a Divisional of U.S. Ser. No. 15/792,810 filed on 25 Oct. 2017, which claims priority from NL application number 2017677 filed on 26 Oct. 2016. Both applications are hereby incorporated by reference in their entireties.

TECHNICAL FIELD

The invention relates to a non-crosslinked natural rubber latex composition for inflatable stoppers and an inflatable stopper formed from a natural rubber latex composition.

BACKGROUND ART

Inflatable stoppers for closing pipes, e.g. gas and water supply pipes, are known. Inflatable stoppers are balloon-like elements which are inserted into an opening in a pipe while deflated, where after the inflatable stopper is filled with pressurized medium so that it inflates to a widened state and closes the passage of the pipe. The pressurized medium may be compressible or incompressible, for example compressed air, nitrogen, hydraulic oil or water. The balloon-like element is applied radially against the inner wall of the pipe with sufficient inner-pressure to achieve an adequate closing pressure. The balloon-like element generally is provided with fibrous reinforcement to be sufficiently strong to withstand the pressure.

Useful methods of manufacturing fiber reinforced inflatable stoppers for pipes are discussed in U.S. Pat. No. 5,477,886 and WO 2011/009630.

Generally, manufacturers of inflatable stoppers need to comply with different technical regulations for safety and reliability of gas or water supply. As the requirements of the technical regulations are increasing, the manufacturers need to enhance resistance and durability of their products and adapt them according to these requirements.

Inflatable stoppers can be formed from rubber compositions containing natural and/or synthetic rubbers as raw materials. Synthetic rubbers are polymers synthesised from petroleum byproducts. Natural rubber (NR), coming from latex of *Hevea brasiliensis*, is mainly poly-cis-isoprene. Although it exhibits many excellent properties in terms of mechanical performance, natural rubber is often inferior to certain synthetic rubbers, especially with respect to its thermal stability and its compatibility with petroleum products. Light, heat, ozone, radiation, flexible deformation and copper, manganese and other metals can promote the aging of rubber. One drawback of natural rubber is that it is more susceptible to ozone attack than synthetic rubbers. To diminish drawbacks and enhance properties, rubbers are usually vulcanized or reinforced with e.g. carbon black as filler.

Another drawback of natural rubber is that it is sensitive to electrostatic charge. In case natural rubber is used as a base material for the inflatable body of an inflatable stopper, this charge can cause sparks in a pipeline, which could lead to an explosion hazard.

Rubber compounds, whether in continuous or intermittent use or in storage, are susceptible to ozone attack. This ozone attack on statically or dynamically employed rubber goods becomes apparent by the development of penetrating cracks which progressively become deeper with time of exposure to the atmosphere, which practically always contains ozone in trace amounts. Such cracks in inflatable stoppers may cause failure. In case new inflatable stoppers are stored for substantial periods before use, such cracks may cause failure within a relatively short time after the stoppers are put into use. Other atmospheric factors, such as sun and humidity also contribute to the deterioration of stressed rubber, but it has been found that the useful life of rubber and rubber-like articles can be greatly prolonged where the effects of ozone can be counteracted.

Ozone is generated from oxygen in the air by ultraviolet light, from sunlight, or by high voltage discharge. Concentrations in rural areas vary from 1 to 5 parts per hundred million, and in larger cities, concentrations as high or higher than 50 parts per hundred million (pphm) have been measured.

The allotropic form of oxygen ($O_3$) has a considerably greater effect on rubber than oxygen ($O_2$) itself. Only a few pphm ozone in air can cause rubber cracking, which may destroy the usefulness of elastomer products. Degradation results from the reaction of ozone with rubber double bonds.

Many prior art attempts have been made to combat ozone cracking in vulcanized rubber compounds and/or synthetic rubbers. Examples include GB1312636 and WO2016/130880. However, these options are generally not applicable to non-crosslinked natural latex rubber, as the rubber latex is a water dispersion before application, and non-crosslinked after application. Further, it has been suggested in the art to provide a protective surface on rubber by introducing substances into the rubber which migrate to the surface thereof to form a film thereon, but this has proven to be of little value during dynamic deformation of the rubber.

Many compounds possess the property of preserving rubber, when incorporated therein, against attack by oxygen, light and heat. Such compounds are termed antioxidants. Several additives have been described to work as antiozonants. The protective effect may result from a reaction with ozone, in which case the term used is chemical antiozonant; or in the case of physical antiozonant an effective barrier against the penetration of ozone at the rubber surface will be provided.

GB771628A relates to the bonding of a reinforcing cord to rubber. It is recognized that the presence of ozone in the air contributes to the degradation of the rubber and also of the bond between the cord and the rubber. The disclosure relates to synthetic rubbery polymer.

U.S. Pat. No. 5,439,032A relates to an elongated cylindrical stopper housing for attachment to a gas pipeline in an air tight engagement which may be accomplished through a commercially available drilling and tapping machine and by an air tight clamp assembly. This patent document does not disclose an inflatable stopper of ozone resistant natural rubber latex.

US2013/186477 relates to stoppers made from nylon, which is a material unrelated to non-vulcanized rubber.

SUMMARY OF THE INVENTION

A first object of the invention is to provide an ozone resistant non-crosslinked natural rubber latex composition useful to produce an inflatable stopper comprising natural rubber latex, a surfactant and ammonia.

Another object of the invention is to provide an inflatable stopper comprising fiber reinforcement and natural rubber latex, wherein the natural rubber latex is ozone resistant.

A further object of the invention is to provide an inflatable stopper having fiber reinforcement and an ozone resistant non-crosslinked natural rubber latex, which is ozone resistant according to ISO 1431/1 at 50 pphm concentration ozone at 23±2° C., for the time frame of 48 hours, atmospheric humidity of 55% and strain static exposure of 20%.

A further object of the invention is to provide an inflatable stopper having fiber reinforcement, whereby the rubber surface of the stopper furthermore has a surface resistivity lower than 100 GΩ, measured at 1000 V and a maximum relative humidity of 30%, when tested accordance with DIN-EN 60079-32-2 and DVGW G 5621-3 (VP), as valid in October 2016.

A further object of the invention is to provide an inflatable stopper having fiber reinforcement, whereby the rubber surface of the stopper has a surface resistivity lower than 100 GΩ, measured at 1000 V and a maximum relative humidity of 30%, when tested in accordance with DIN-EN 60079-32-2 and DVGW G 5621-3 (VP) as valid in December 2016.

The present invention provides a specific new composition, which protects non-crosslinked natural rubber latex against deterioration by ozone attack, especially after exposure of the non-crosslinked natural rubber latex to ozone concentration of 50 pphm.

The present invention furthermore provides a composition and an inflatable stopper that prevents the natural rubber latex to be electrostatically charged by keeping the surface resistivity under 100 GΩ when measured at 1000 V and maximum 30% humidity.

The present invention provides a composition that protects non-crosslinked natural rubber latex against deterioration by ozone attack, especially after exposure of the non-crosslinked natural rubber latex to ozone concentration of 50 pphm, while the composition also prevents the natural rubber latex to be electrostatically charged by keeping the surface resistivity lower than 100 GΩ when measured at 1000 V and maximum 30% humidity.

One or more objects of the invention is achieved by providing a natural rubber latex composition comprising natural rubber latex with a homogeneously dispersed or dissolved amine ozone scavenger.

The further aspect of the invention concerns an ozone resistant inflatable stopper comprising non-crosslinked natural rubber latex and fiber reinforcement, the rubber having an ozone resistance according to ISO 1431/1.

The further aspect of the invention concerns an ozone resistant inflatable stopper comprising non-crosslinked natural rubber latex and fiber reinforcement, the rubber having a surface resistivity lower than 100 GΩ according to DIN EN 60079-32-2 and DVGW G 5621-3 (VP).

A further aspect of the invention is the combined property of an ozone resistant and anti-static inflatable stopper comprising non-crosslinked natural rubber latex and fiber reinforcement, the rubber having an ozone resistance according to ISO 1431/1, and the rubber having a surface resistivity lower than 100 GΩ according to DIN EN 60079-32-2 and DVGW G 5621-3 (VP).

A further aspect of the invention concerns an inflatable stopper comprising a rubber latex base layer and a secondary layer with fiber reinforcement and a non-crosslinked natural rubber latex which adheres to the fibers and the base layer, at least one rubber latex layer being ozone resistant according to ISO1431/1 at an ozone concentration of 50 pphm and preferably also having a surface resistivity lower than 100 GΩ according to DIN EN 60079-32-2 and DVGW G 5621-3 (VP).

The several aspects of the invention may further comprise the following preferred features.

In a preferred embodiment, the natural rubber latex composition comprises a homogeneously dispersed mixture of natural rubber latex, preferably ammonia, surfactant, and an amine based ozone scavenger.

In a further preferred embodiment of the invention, the latex comprises single or double wall electrically conductive carbon nano tubes, preferably carbon nano tubes.

A preferred embodiment relates to a process to prepare the homogeneously dispersed natural rubber latex, by dissolving an amine ozone scavenger in a surfactant, optionally with a solvent and ammonia, and mixing the dissolved scavenger solution with the natural rubber latex.

A further preferred embodiment relates to a process to prepare the homogeneously dispersed natural rubber latex, by mixing single or double wall electrically conductive nanotubes, such as preferred carbon nano-tubes, with a surfactant which is preferably, subsequently mixed with an amine ozone scavenger, after which the latter mixture is mixed with demineralized water and subsequently mixed with the natural rubber latex.

DETAILED DESCRIPTION

The term "ozone resistant natural rubber latex composition" preferably relates to a non-crosslinked natural rubber latex comprising natural rubber latex, a surfactant, an amine based antiozonant and possibly ammonia.

The term "low surface resistivity natural rubber latex composition" preferably relates to a non-crosslinked natural rubber latex comprising natural rubber latex, a surfactant and electrically conductive single or double wall nanotubes.

As used herein, the term "ozone resistant" is used when referring to ozone resistance measured according to ISO 1431/1 at an ozone concentration of 50 pphm at 23±2° C., for the time frame of 48 hours, atmospheric humidity of 55% and strain static exposure of 20%.

As used herein, the term "low surface resistivity" is used when referring to surface resistivity according to DIN EN 60079-32-2 and DVGW G 5621-3 (VP), tested at 1000 V and a relative humidity of maximum 30%.

Laboratory ozone resistance tests involve the exposure of stretched test pieces, usually strips or dumbbells, to a specified combination of ozone concentration and temperature. The standard concentrations permitted in ISO 1431/1 (B S903, Part A43) are 25, 50, 100 and 200 pphm ozone. The lowest concentration is intended for applications used under low-severity conditions, whereas the present invention provides for an ozone resistance at 50 pphm. The usual test strain for static exposure is 20%, which is representative of a range of products and sufficiently high to ensure the use of a suitably resistant compound.

The rubber of the present invention is a non-crosslinked natural rubber latex, which is generally obtained from *Hevea brasiliensis*.

The antiozonant used in the present invention is an amine based scavenger. Amine based antiozonants are known as such, and comprise an aromatic ring with aliphatic or aromatic substituted amines.

The most effective antiozonants, suitable for use in the present invention are derivatives of p-phenylenediamine (p-PDA) which fall into three general classes:

N,N'-dialkyl-p-PDA, N-alkyl-N'-aryl-p-PDA, and N,N'-diaryl-p-PDA. Without being limited to theory, it is believed that the p-PDA antiozonant diffuses to the surface and preferentially reacts with ozone.

In a preferred embodiment the antiozonant is N,N'-dialkyl-p-phenylenediamine (N,N'-dialkyl-p-PDA) antiozonant.

This antiozonant class is found to protect non-crosslinked natural rubber latex against oxygen degradation with high efficacy.

Most preferably the antiozonant is N,N'-bis-(1,4-dimethylpentyl)-p-phenylenediamine. The chemical structure of N,N'-bis-(1,4-dimethylpentyl)-p-phenylenediamine is depicted below.

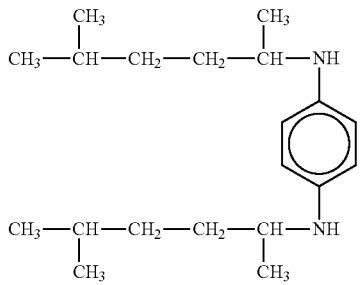

Chemical Structure of N,N'-bis-(1,4-dimethylpentyl)-p-phenylenediamine

It is found that the antiozonant provides outstanding protection. It protects the non-crosslinked natural rubber against ozone degradation.

The chemical composition of the rubber latex used to make an inflatable stopper comprises next to the natural rubber latex, a surfactant, preferably single or double wall carbon nanotubes and an antiozonant which are added to natural latex.

The surfactant may be used to stabilize the natural rubber latex, but at least is effective in dissolving the antiozonant. Preferably, the surfactant is also effective in dispersing the single or double wall carbon nanotubes such that, preferably, the carbon nanotubes are homogeneously dispersed through the latex.

Various non-ionic, cationic or anionic surfactants have been described in the literature and are available commercially. Typical examples of surfactants for latex coatings can include but are not limited to sodium lauryl sulfate, sodium dodecyl sulfate (SDS), dodecyltrimethylammonium bromide (DoTAB), phosphate esters, ethoxylated alcohols or phenols.

Preferably, a nonionic surfactant is used in the present invention, comprising polyethyleneoxide chains and a hydrophobic group. Suitable surfactants include ethoxylated fatty alcohols, polyethyleneglycol and fatty acid comprising surfactants and the like. As non-ionic surfactants, for example the commercially available Carbowet® 138 surfactant is suitable.

The preferred nonionic surfactant preferably is used for dispersing the nanotubes and/or (preferably subsequently if both are used) for dissolving the antiozonant, while other surfactants can be used to (further) stabilize the rubber latex.

The nanotubes are conductive for electrical charge, and preferably are carbon nanotubes, as these are generally available.

The single wall or double wall electrically-conductive nano tubes preferably are homogeneously dispersed in the rubber latex.

The single wall or double wall electrically-conductive nano tubes preferably are carbon nanotubes with a diameter, generally in the range between 1-100 nm, preferably about 50 nm or less, more preferably about 20 nm or less and 4 nm or more, and a length of 0.1-100 µm, preferably 0.1-10 µm. In a preferred embodiment, the aspect ratio of the length over the diameter of the nano tubes is about 10 or more, preferably about 30 or more, and even more preferably about 50 or more. Generally, the aspect ratio will be about 1000 or less, like about 300 or less.

In a preferred embodiment, the inflatable closing plug is a low surface resistivity inflatable stopper comprising non-crosslinked natural rubber latex and fiber reinforcement, the rubber having a surface resistivity lower than 100 GΩ according to DIN EN 60079-32-2 and DVGW G 5621-3 (VP), wherein the stopper comprises a rubber latex base layer and a secondary layer with fiber reinforcement and a non-crosslinked natural rubber latex which adheres to the fibers and the base layer, at least one rubber latex layer having a surface resistivity according to DIN EN 60079-32-2 and DVGW G-5621-3 (VP) of lower than 100 GΩ. Preferably, said rubber latex layer comprises as antistatic ingredient, carbon nanotubes having a diameter ranging from 1-100 nm, more preferably 1-50 nm, even more preferable 4-20 nm, and a length of 0.1-100 µm, preferably 0.1-10 µm. In a preferred embodiment, the aspect ratio of the length over the diameter of the nano tubes is about 10 or more, preferably about 30 or more, and even more preferably about 50 or more. Generally, the aspect ratio will be about 1000 or less, like about 300 or less.

The natural rubber latex may further comprise other emulsifiers or stabilizers, like polymeric surfactants such as for example a modified acrylic polymeric emulsion surfactant like K-STAT®, Neostatic, 2-butoxyethanol and/or ammonia. Such additives are useful to provide a non-crosslinked rubber layer with well coalesced rubber. As such, these surfactants are known to the skilled person.

The rubber composition may further comprise additives such as an UV absorber, such as for example Uvasorb K289, and/or coloring agents, such as pigments or dyes. Suitable colors include red, blue, green or the like.

Upon drying, the latex particles will coalesce, and form a continuous layer, while, in case ammonia is used, the ammonia will evaporate from the rubber latex.

Useful methods of manufacturing inflatable stoppers for pipes are discussed in U.S. Pat. No. 5,477,886 and WO 2011/009630, the contents of which are hereby included by reference.

An inflatable stopper can be produced by providing a mold to build the stopper balloon, applying a layer of latex on the mold, and causing the latex to coagulate and form a continuous base layer. The mold can for example be removed, and the base layer inflated for further manufacturing of the balloon. On the base layer, fibers can be applied that are impregnated with additional natural rubber latex during the application process. In this way a secondary layer is formed onto the base layer, whereby the fibers are embedded in the secondary natural rubber latex layer, whereby the fibers adhere to each other and the secondary layer as a whole adheres to the base layer. A flexible, strong balloon with natural rubber latex is formed in this way.

The ozone resistant and preferably antistatic natural rubber latex is preferably used in both layers having natural rubber, but is at least used as the innermost or outermost coating layer. Use of an ozone resistant and preferred low surface resistivity coating is in particular important as innermost and/or outermost layer, as the ozone scavenger preferably is precluding the diffusion of ozone into the rubber layer. For ease of production, and robustness of the product, it is preferred to have the ozone resistant property in all rubber latex layers.

A test piece of the natural rubber as used for making a balloon according the invention generally will show a tensile strength of higher than 20 N/mm², and an elongation at break of at least 375% according to DIN53504 and DIN53508 as valid in December 2016.

The fibers can be carbon fibers, glass fibers, polyester fibers (like Twaron®), strong polyethylene fibers (like Dyneema®), and preferably are Dyneema® fibers.

The balloon according the invention is further mounted with appliances as known in the art, to obtain a system that can be used to close pipes.

The invention also comprises a system suitable for closing pipes, having a balloon according the present invention and appliances as known in the art.

The inflatable stoppers according to the invention are suitable for closing pipes, e.g. gas, oil and water supply pipes. Inflatable stoppers with the balloon-like element are inserted into an opening in a pipe while deflated, where after the inflatable stopper is filled with pressurized medium so that it inflates to a widened state and closes the passage of the pipe. The pressurized medium may be compressible or incompressible, for example compressed air, nitrogen, hydraulic oil or water. The balloon-like element is applied radially against the inner wall of the pipe with sufficient inner-pressure to achieve an adequate closing pressure.

The inflatable stopper according the invention is suitable for use in for example sewage systems, gas pipelines and water works.

The inflatable stopper according the invention preferably is suitable for temperatures up to 70° C., preferably up to 100° C.

The descriptions above and examples below are intended to be illustrative and not limiting. It will be apparent to the person skilled in the art that alternative and equivalent embodiments of the invention can be conceived and reduced to practice, without departing from the scope of the claims set out below.

EXAMPLES

Example 1; Formulation A 6 mL Flexzone® 4 L was mixed with 3 mL Carbowet® 138 Surfactant to provide MIX 1. A second mixture was provided by diluting 7.5 mL modified acrylic polymeric emulsion surfactant (K-STAT® 1300) with 15 mL ammonia (MIX 2). Thereafter, MIX 1 was added to 500 mL DX 7349/1 non-crosslinked natural rubber latex and the mixture was homogenized during 3 minutes. Thereafter, MIX 2 was added to 500 mL DX 7349/1 non-crosslinked natural rubber latex and the mixture was homogenized for 3 minutes.

Example 2; Formulation B 6 mL Uvasorb K289 was mixed with 6 mL ammonia (MIX 1). Furthermore, 6 mL Flexzone® 4 L was mixed with 3 mL Carbowet® 138 Surfactant (MIX 2). Also, 7.5 mL modified acrylic polymeric emulsion surfactant (K-STAT® 1300) was mixed with 15 mL ammonia (MIX 3). Next, to 500 mL DX 7349/1 natural rubber latex MIX 2 was added, and the resulting mixture was homogenized for 3 minutes. To the resulting natural rubber latex mixture MIX 1 was added, and mixed for 3 minutes. As the last step, MIX 3 was added, and mixed for 3 minutes.

Test strips were prepared from the latex composition, and the strips were tested according ISO 1431/1 (50 pphm ozone); both test strips were in conformity with the test; no cracks were visible.

Further formulations were prepared as above but without antiozonant. The result was not in conformity with the standard ISO 1431/1 as it was severely cracked.

Example 3; Formulation C

A mixture I (MIX 1) was made consisting of 1 gram ICH CC VS coloring pigment and 500 gram natural rubber (latex). A mixture 2 (MIX 2) was made consisting of 5 gram Carbowet 138 surfactant and 0.5 gram Nanocyl NC7000 nanotubes. MIX 2 preferably is kept for a period of time of 6 hours or longer, and for a preferred period of 48 hours in order to set and to create a homogenous gel. Subsequently a mixture 2A (MIX 2A) was made whereby 5 gram Flexzone 4L was mixed with MIX 2. After mixing, MIX 2B was diluted with demineralized water in a 50/50 ratio. The obtained MIX 2B was added to 500 gr MIX 1, being the natural rubber (latex). MIX 2A contains specific weight quantities of the various ingredients whereby the final weight percentages of the various ingredients are determined by evaporation of water and some of the ingredients, if any.

Test strips were prepared from formulation C, and the strips were tested according to ISO 1431/1 (50 pphm ozone) and DIN EN 60079-32-2/DVGW G 5621-3 (VP).

The test strips were in conformity with the ozone resistance test, and furthermore, the surface resistivity did not exceed 100 GΩ measured at 1000 V and maximum 30% relative humidity.

The ozone improvement has been demonstrated according to standard ISO 1431/1. The latter specifies procedures intended for use in estimating the resistance of vulcanized or thermoplastic rubbers to cracking when exposed, under static or dynamic tensile strain, to air containing a definite concentration of ozone and at a definite temperature in circumstances that exclude the effects of direct light.

The low surface resistivity has been demonstrated according to standard DIN60079-32-2 and DVGW G 5621-3 (VP). Both specify test methods, test procedures and test requirements concerning the equipment, product and process properties necessary to avoid ignition and electrostatic shock hazards arising from static electricity.

The invention claimed is:

1. A low surface resistivity inflatable stopper comprising non-crosslinked natural rubber latex and fiber reinforcement, the rubber having a surface resistivity lower than 100 GΩ according to DIN EN 60079-32-2 and DVGW G 5621-3 (VP), wherein the stopper comprises a rubber latex base layer and a secondary layer with fiber reinforcement and a non-crosslinked natural rubber latex which adheres to the fibers and the base layer, at least one rubber latex layer having a surface resistivity according to DIN EN 60079-32-2 and DVGW G-5621-3 (VP) of not exceeding 100 GΩ.

2. The inflatable stopper of claim 1, wherein the rubber latex comprises as antistatic ingredient, carbon nanotubes having a diameter ranging from 1-100 nm, and a length of 0.1-100 μm.

3. The inflatable stopper of claim 2, wherein the carbon nanotubes have a diameter ranging from 1-50 nm.

4. The inflatable stopper of claim 2, wherein the carbon nanotubes have a diameter ranging from 4-20 nm.

5. The inflatable stopper of claim 2, wherein the carbon nanotubes have a length of 0.1-10 μm.

6. The inflatable stopper of claim 2, wherein the aspect ratio of the length over the diameter of the carbon nanotubes is about 10 or more.

7. The inflatable stopper of claim 2, wherein the aspect ratio of the length over the diameter of the carbon nanotubes is about 30 or more.

8. The inflatable stopper of claim 2, wherein the aspect ratio of the length over the diameter of the carbon nanotubes is about 50 or more.

9. The inflatable stopper of claim 2, wherein the aspect ratio of the length over the diameter of the carbon nanotubes is about 1000 or less.

10. The inflatable stopper of claim 2, wherein the aspect ratio of the length over the diameter of the carbon nanotubes is about 300 or less.

\* \* \* \* \*